United States Patent
Jonsson

(10) Patent No.: US 7,520,029 B2
(45) Date of Patent: Apr. 21, 2009

(54) DEVICE FOR ATTACHING A TOOL TO HARNESS

(75) Inventor: Tore Jonsson, Huskvarna (SE)

(73) Assignee: Husqvarna AB, Huskvarna (SE)

( * ) Notice: Subject to any disclaimer, the term of this patent is extended or adjusted under 35 U.S.C. 154(b) by 703 days.

(21) Appl. No.: 10/497,509

(22) PCT Filed: Dec. 12, 2002

(86) PCT No.: PCT/SE02/02324

§ 371 (c)(1),
(2), (4) Date: Jan. 5, 2005

(87) PCT Pub. No.: WO03/051100

PCT Pub. Date: Jun. 26, 2003

(65) Prior Publication Data

US 2005/0109806 A1    May 26, 2005

(30) Foreign Application Priority Data

Dec. 17, 2001    (SE) .................................... 0104277

(51) Int. Cl.
*B25G 1/00* (2006.01)
(52) U.S. Cl. ......................................... 16/426; 419/420
(58) Field of Classification Search ................... 16/426, 16/420, 419, 406, 413, 422
See application file for complete search history.

(56) References Cited

U.S. PATENT DOCUMENTS

| 280,667 | A | * | 7/1883 | P'Pool | 16/426 |
| 1,083,054 | A | * | 12/1913 | Brown | 294/58 |
| 1,374,061 | A | * | 4/1921 | Coleman | 294/58 |
| 1,534,075 | A | * | 4/1925 | Washington | 16/426 |
| 2,530,215 | A | * | 11/1950 | Zidar | 30/254 |
| 4,841,929 | A | | 6/1989 | Tuggle et al. | |
| 5,054,830 | A | * | 10/1991 | Nisenbaum | 294/58 |
| 5,133,582 | A | * | 7/1992 | Rocha | 294/58 |
| 5,265,341 | A | * | 11/1993 | Kikuchi | 30/276 |
| 5,487,577 | A | * | 1/1996 | Ball | 294/58 |
| 5,496,085 | A | * | 3/1996 | Middleton | 294/58 |
| 5,669,101 | A | * | 9/1997 | Aiyama et al. | 16/436 |
| 6,158,636 | A | | 12/2000 | Latiolais | |
| 6,343,822 | B1 | * | 2/2002 | Badura | 294/58 |
| 6,581,246 | B1 | * | 6/2003 | Polette | 16/429 |
| 2003/0074765 | A1 | * | 4/2003 | Quimby | 16/426 |
| 2007/0209162 | A1 | * | 9/2007 | McRoberts et al. | 16/426 |
| 2008/0040892 | A1 | * | 2/2008 | Jenkins | 16/426 |

FOREIGN PATENT DOCUMENTS

DE    3536676 A1    4/1987

* cited by examiner

*Primary Examiner*—Amy J. Sterling
(74) *Attorney, Agent, or Firm*—Pearne & Gordon LLP

(57) ABSTRACT

Device for a portable engine powered tool that is carried by a hook secured to a harness or a strap in order to reduce the loads on the operator. The tool is attached to the hook by a loop (19) placed close to the centre of gravity for the tool to facilitate the control of the operator.

13 Claims, 3 Drawing Sheets

US 7,520,029 B2

DEVICE FOR ATTACHING A TOOL TO HARNESS

Figure 1:

This application claims the benefit of International Application Number PCT/SE02/02324, which was published in English on Jun. 26, 2003.

Loop for attaching a portable, elongated, engine powered tool to a hook secured to a harness or a strap. The loop being secured to the tool in such a way that it is allowed to turn around an axis substantially parallel to the longitudinal axle of the tool.

Engine powered tool are widely used to facilitate work in forests, gardens and parks. There are a number of different tools available like for example trimmers, clearing saws and different types of cutters. These tools are available in different sizes to meet the requirements for different kinds of work. The smallest ones are hand held while bigger and heavier tools are carried in an ergonomic harness or strap.

One well known type of tool have the engine and related components placed in one end of a tube while the working tool is placed in the other end of the tube. The working tool could be of different kinds and the length of the tube is selected to meet the requirements for the specific work that the tool is expected to be used for. For example is the length of the tube on a grass trimmer selected so that the operator will be able to walk upright with the working tool in a suitable height over the ground while a tool for pruning of trees have a longer tube so that the operator will be able to reach the top of the tree standing on the ground.

In order to improve the working conditions for the operator are the tools carried in a harness or a strap placed over the shoulders and back of the operator. This means that the operator carries the weight of the tool by the shoulders and back while the arms are used for controlling and steering the tool to perform the work.

The tool is normally attached to the harness or strap by a hook secured to the harness or strap. The tool is attached to the hook by a loop or shackle on the tool that the hook is connected to. This loop or shackle is placed close to the centre of gravity for the tool so that the tool will be balanced when it is attached to the harness or strap. This facilitates the control and steering of the tool considerably, which is favourable for the operator.

The known loops and shackles that are used are either fastened or integrated in the tools. These types of loops and shackles have a negative impact on the manoeuvrability of the tool during use since the operator must use a big force to manoeuvre the tool in the device for attachment of the tool to the harness.

In this application is a device for attachment of a tool to a harness or strap described that will improve the manoeuvrability and male the controlling and steering of the tool easier for the operator.

The new device for attachment of the tool to the harness is constituted of a loop secured to the tool close to the centre of gravity for the tool. The loop is placed substantially parallel to the longitudinal axle of the tube with the openings in the loop substantially transverse to the longitudinal direction of the tube. The loop is secured to the tool in such a way that it is allowed turn around the point where it is secured to the tool. The loop is turning around an axle substantially parallel to the longitudinal axle of the tool.

In order to keep the stability in the attachment of the tool to the harness is the loop only allowed to turn around the axle within a selected range. This range is selected so that the loop is allowed to turn from an upright position to a position where the loop is placed at an angle of 45 degrees in the outwards direction in relation to the operator when the tool is placed in its right position close to the operators hip. This range makes the loop work in a satisfying way with good stability and manoeuvrability of the tool. The prefered range could be different for different types of tools and operators but are selected so that the loop will turn more in one direction that the other direction in relation to a vertical plane through the longitudinal axle of the tool in normal position.

The loop described above makes it easier for the operator to turn the tool sideways when it is attached to the harness. This facilitates for the operator and makes it easier for the operator to control and steer the tool to perform the desired work.

When the tool not is used is the tool released from the harness or strap by removing the loop from the hook secured on the harness or strap. The loop is provided with a spring that returns the loop to the upright position when the loop not is exposed to any loads. This feature makes it easier to attach and detach the loop from the hook since the upright position makes attachment and detachment most easy for the operator.

One embodiment of the claimed invention is illustrated in the drawings.

FIG. 1. Illustrates a tool for pruning of trees. The tool is carried in a harness.

Figure 2:
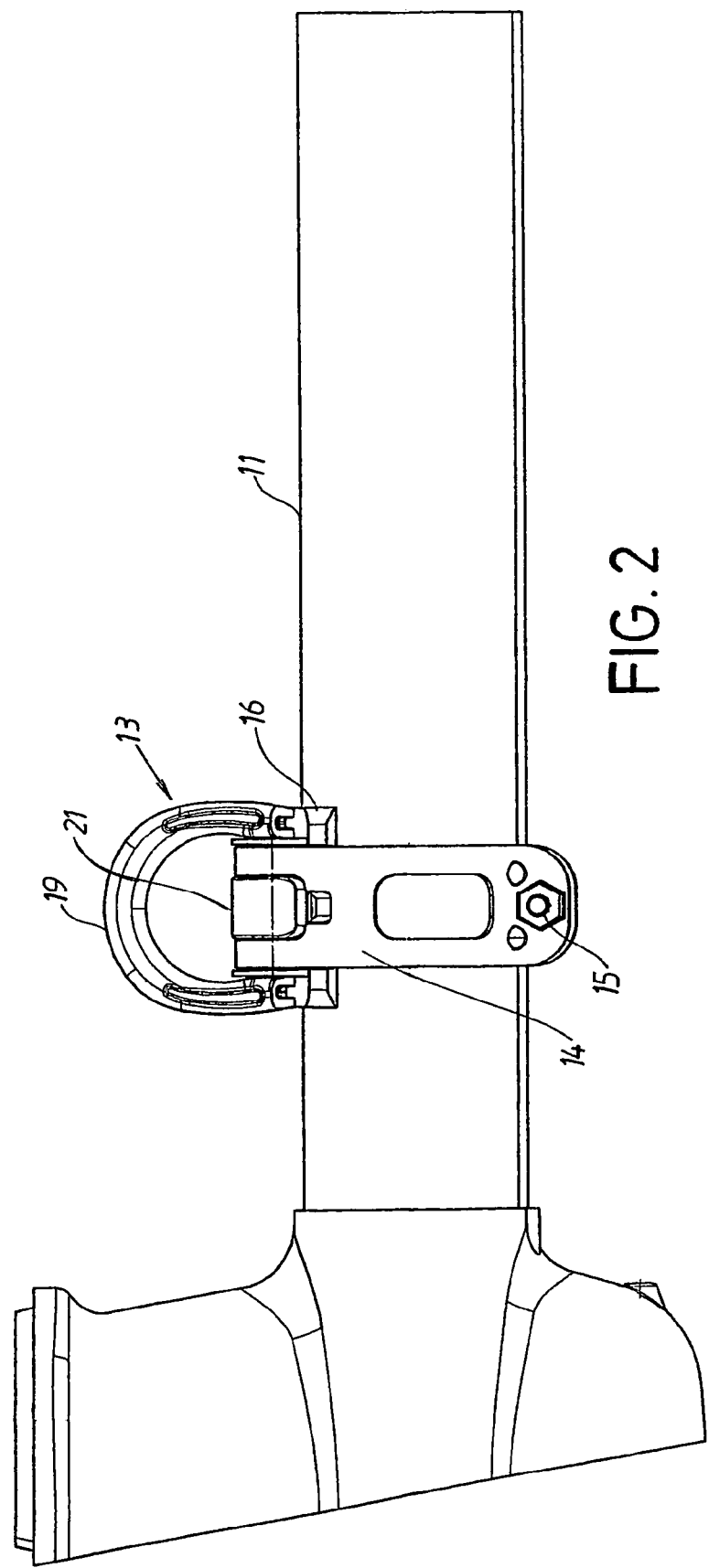

FIG. 2. Illustrates a loop secured on a tube for a tool.

Figure 3:
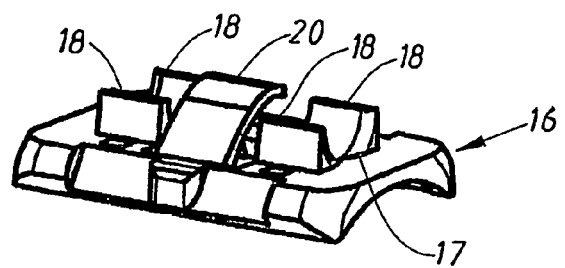

FIG. 3. Illustrates the lower section of the device for securing of the loop to the tube.

Figure 4:
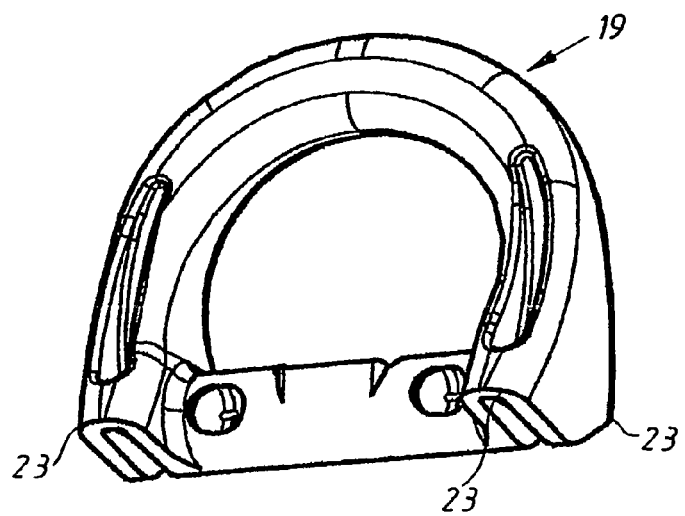

FIG. 4. Illustrates the loop that is attached to the hook on to the harness or strap.

Figure 5:
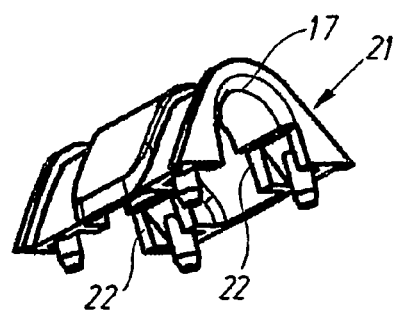

FIG. 5. Illustrates the covering section of the device for securing of the loop to the tube.

In FIG. 1 is a tool with an engine 10 and related components placed in one end of a tube 11. The other end of the tube 10 is provided with a working tool 12. The tool in figure one is a saw for pruning of trees.

Close to the centre of gravity for the tool is a device 13 for attachment of the tool to a harness or a strap secured. The device 13 is secured to the tool by a strap 14 that surrounds a part of the tool or tube and the device 13 at the selected position for the device 13. A screwed joint 15 fastens the strap 14. The position of the device 13 is changed by releasing the screw joint 15 and the tension in the strap 14 so that the device 13 could be moved to another position on the tool that is selected by the operator.

The device 13 comprises of a lower section 16 that aligns the tube 11 or another part of the tool. The lower section 16 is designed for a stable connection to the tool. On the top surface of the lower section 16 are two recesses 17 and four supports 18 placed to keep a loop 19 in the right position. The loop 19 is placed in the recesses 17 and between the supports 18 The lower section 16 is also provided with a spring 20 for returning the loop 19 to the upright position when the loop 19 not is in use.

A covering section 21 that is extending through the loop 19 is placed on top of the spring 20, the recesses 17 and the supports 18 and a part of the loop 19. The covering section 21 is also provided with two recesses 17 and four supports 22 that are matching the recesses 17 and the supports 18 on the lower section 16 so that the loop 19 is kept in the right position in the lower section 16. The loop 19 is shaped to fit in the recesses 17 and between the supports 18 without reducing the ability for the loop 19 to turn around an axle that is substantially parallel to the longitudinal direction of the tube 11. The strap 14 that is fastening the device 13 to the tool is finally put around the tool, the lower section 16, covering section 21 and the loop 19 so that all components are secured to the tool.

The part of the loop 19 that is in contact with the lower section 16 is shaped so that the loop 19 only can turn within the selected range, in this case within a range of 45°. The range is set by the shape of the part of the loop 19 in contact with the lower section 16. The loop 19 is only allowed to turn from the upright position to a position 45 degrees outward seen from the operator. Two protruding sections 23 that will align the lower section 16 when the loop 19 reaches the end of the range stops further movements of the loop 19.

The invention claimed is:

1. Loop (19) for attaching a hook secured to a harness or a strap supported by an operator to a portable, elongated, engine powered tool, said loop (19) being secured to the tool in such a way that it said loop (19) is allowed to pivot around an axis oriented substantially parallel to a longitudinal axis of the tool, characterized in that the loop (19)is allowed to pivot within a predetermined range that is wider in a first direction than in an opposite second direction with respect to an upright position of the loop (19) in relation to a vertical plane through the longitudinal axis of the tool when the tool is in a normal position, characterized in that the loop (19) comprises a pivotal end that is pivotally secured to the tool by a device (13) having a lower section (16) adapted to receive the pivotal end, and further characterized in that the loop (19) comprises a protruding section (23) adjacent the pivotal end that is adapted to abut a portion of the lower section (16) to define the predetermined range with respect to the second direction.

2. Loop (19) for attaching a hook secured to a harness or a strap supported by an operator to a portable, elongated, engine powered tool, said loop (19) being secured to the tool in such a way that it said loop (19) is allowed to pivot around an axis oriented substantially parallel to a longitudinal axis of the tool, characterized in that the loop (19) is allowed to pivot within a predetermined range that is wider in a first direction than in an opposite second direction with respect to an upright position of the loop (19) in relation to a vertical plane through the longitudinal axis of the tool when the tool is in a normal position, characterized in that the loop (19) comprises a pivotal end that is pivotally secured to the tool by a device (13) having a lower section (16) adapted to receive the pivotal end, and further characterized in that the lower section (16) includes a spring (20) adapted to engage a portion of the pivotal end to resiliently bias the loop (19) towards the upright position.

3. Loop according to claims 1 or 2, characterized in that the loop (19) includes an opening that is oriented substantially transverse to said longitudinal axis of the tool, and further characterized in that the opening is adapted to receive a hook secured to a harness or a strap supported by an operator.

4. Loop according to claims 1 or 2, characterized in that the loop (19) is allowed to pivot between the upright position and a position 45° outwards in relation to a normal position of the tool arranged adjacent to an operators hip.

5. Loop according to claims 1 or 2, characterized in that the loop (19) is secured to the tool by the device (13) placed close to a centre of gravity for the tool.

6. Loop according to claims 1 or 2, characterized in that the device (13) comprises a covering section (21), and a strap (14), wherein a tension in the strap (14) secures the device (13) to the tool, and further characterized in that the loop (19) is selectively movable along the longitudinal axis of the tool when the tension in the strap (14) that secures the device (13) to the tool is released.

7. Loop according to claim 6, characterized in that the covering section (21) is coupled to the lower section (16) and maintains a location of the loop (19) with respect to the rower section (16).

8. Loop according to claim 6, characterized in that the lower section (16) is adapted to receive a portion of the loop (19), and further characterized in that the portion of the loop (19) that is received by the lower section (16) is shaped so that the loop in combination with the lower section (16) is only allowed to pivot within the predetermined range.

9. An apparatus for attaching a harness or a strap supported by an operator to a portable, elongated, engine powered tool, said apparatus comprising:

a loop (19) having a pivotal end and an opening that is oriented substantially transverse to a longitudinal axis of the tool;

a lower section (16) having a recess for receiving the pivotal end of the loop (19); and a covering section (21) coupled to the lower section (16) to maintain the pivotal end of the loop (19) within the recess of the lower section (16), characterized in that the loop (19) is allowed to pivot with respect to the lower section (16) about a pivot axis oriented substantially parallel to the longitudinal axis of the tool, and further characterized in that the loop (19) is allowed to pivot about the pivot axis, with respect to an upright position of the loop (19) towards a first direction within a first predetermined range and towards a second direction within a second predetermined range, the first predetermined range being greater than the second predetermined range, characterized in that the loop (19) comprises a protruding section (23) adjacent the pivotal end that is adapted to abut a portion of the lower section (16) to define the second predetermined range.

10. An apparatus for attaching a harness or a strap supported by an operator to a portable, elongated, engine powered tool, said apparatus comprising:

a loop (19) having a pivotal end and an opening that is oriented substantially transverse to a longitudinal axis of the tool;

a lower section (16) having a recess for receiving the pivotal end of the loop (19); and a covering section (21) coupled to the lower section (16) to maintain the pivotal end of the loop (19) within the recess of the lower section (16), characterized in that the loop (19) is allowed to pivot with respect to the lower section (16) about a pivot axis oriented substantially parallel to the longitudinal axis of the tool, and further characterized in that the loop (19) is allowed to pivot about the pivot axis, with respect to an upright position of the loop (19), towards a first direction within a first predetermined range and towards a second direction within a second predetermined range, the first predetermined range being greater than the second predetermined range, characterized in that the lower section (16) includes a spring (20) adapted to engage a portion of the pivotal end to resiliently bias the loop (19) towards the upright position.

11. The apparatus according to claim 10, characterized in that the covering section (21) is adapted to bias the spring (20) towards the pivotal end of the loop (19).

12. The apparatus according to claims 9 or 10, characterized in that the second predetermined range is defined between the upright position and a position approximately 45° outwards of the upright position.

13. The apparatus according to claims 9 or 10, further comprising a strap (14) adapted to secure the loop (19), the lower section (16) and the covering section (21) to the tool via tension in the strap (14), characterized in that the loop (19) is selectively movable along the longitudinal axis of the tool when the tension in the strap (14) is released.

* * * * *

UNITED STATES PATENT AND TRADEMARK OFFICE
CERTIFICATE OF CORRECTION

| | | |
|---|---|---|
| PATENT NO. | : 7,520,029 B2 | |
| APPLICATION NO. | : 10/497509 | |
| DATED | : April 21, 2009 | |
| INVENTOR(S) | : Tore Jonsson | |

It is certified that error appears in the above-identified patent and that said Letters Patent is hereby corrected as shown below:

Column 1, line 52, delete "male" and insert --make--;
Column 3, line 14, delete "it";
Column 3, line 33, delete "it";
Column 4, line 3, delete "rower" and insert --lower--;
Column 4, line 28, delete "(19)" and insert --(19),--.

Signed and Sealed this
Twenty-fifth Day of January, 2011

David J. Kappos
*Director of the United States Patent and Trademark Office*